US010005167B2

(12) United States Patent
Sodemann et al.

(10) Patent No.: US 10,005,167 B2
(45) Date of Patent: Jun. 26, 2018

(54) SYSTEMS AND METHODS FOR REAL-TIME MONITORING OF MICROMILLING TOOL WEAR

(71) Applicant: Arizona Board of Regents on behalf of Arizona State University, Scottsdale, AZ (US)

(72) Inventors: Angela A. Sodemann, Gilbert, AZ (US); Anuj K. Bajaj, Tempe, AZ (US); Jason R. Vaughn, Chandler, AZ (US)

(73) Assignee: Arizon Board of Regents on behalf of Arizona State University, Scottsdale, AZ (US)

( * ) Notice: Subject to any disclaimer, the term of this patent is extended or adjusted under 35 U.S.C. 154(b) by 0 days. days.

(21) Appl. No.: 15/823,804

(22) Filed: Nov. 28, 2017

(65) Prior Publication Data
US 2018/0079045 A1    Mar. 22, 2018

Related U.S. Application Data

(60) Division of application No. 15/227,229, filed on Aug. 3, 2016, now Pat. No. 9,849,554, which is a
(Continued)

(51) Int. Cl.
*B23Q 17/09*    (2006.01)
*B23Q 11/00*    (2006.01)
(Continued)

(52) U.S. Cl.
CPC ...... *B23Q 17/0952* (2013.01); *B23Q 11/0046* (2013.01); *B23Q 11/0075* (2013.01);
(Continued)

(58) Field of Classification Search
CPC . B23Q 17/2452; B23B 35/00; B23B 2270/30; B23B 2270/54; B23B 2270/62; B23C 2230/00; B23C 2230/04; B23C 2230/08; B23C 2230/48; G05B 19/4065; G05B 2219/37256; G05B 2219/37258; G06T 2207/30242; Y10T 408/03;
(Continued)

(56) References Cited

U.S. PATENT DOCUMENTS 3,694,637 A * 9/1972 Edwin ................ G05B 19/4065
340/680
4,011,792 A * 3/1977 Davis ................... B23Q 11/006
408/241 R
(Continued)

FOREIGN PATENT DOCUMENTS

JP    56033151 U  *  4/1981

*Primary Examiner* — Sunil K Singh
*Assistant Examiner* — Michael Vitale
(74) *Attorney, Agent, or Firm* — Snell & Wilmer L.L.P.

(57) ABSTRACT

The wear status of a micro-endmill tool may be inferred by monitoring the chip production rate of the tool in operation. Chips may be extracted from a work area, captured on an adhesive surface, imaged, and counted to determine the chip production rate. When the rate of chip production falls, the feed rate of the micro-endmill may be modified to a level suitable for the current state of tool wear. In this manner, costly and inconvenient work stoppages to evaluate the wear status of a tool are eliminated.

16 Claims, 9 Drawing Sheets

Related U.S. Application Data continuation of application No. PCT/US2015/014848, filed on Feb. 6, 2015.

(60) Provisional application No. 61/936,607, filed on Feb. 6, 2014.

(51) Int. Cl.
| | | |
|---|---|---|
| *B23C 1/00* | (2006.01) | |
| *B23C 9/00* | (2006.01) | |
| *G06T 7/136* | (2017.01) | |
| *G06T 7/13* | (2017.01) | |
| *G06T 3/40* | (2006.01) | |
| *G06T 7/00* | (2017.01) | |
| *G05B 19/4065* | (2006.01) | |
| *B23Q 17/24* | (2006.01) | |

(52) U.S. Cl.
CPC ..... *B23Q 17/0904* (2013.01); *B23Q 17/2452* (2013.01); *G05B 19/4065* (2013.01); *G06T 3/403* (2013.01); *G06T 7/0004* (2013.01); *G06T 7/13* (2017.01); *G06T 7/136* (2017.01); *B23C 2230/04* (2013.01); *B23C 2230/08* (2013.01); *G05B 2219/37256* (2013.01); *G05B 2219/37258* (2013.01); *G06T 2207/10024* (2013.01); *G06T 2207/20192* (2013.01); *G06T 2207/30242* (2013.01); *Y10T 408/21* (2015.01); *Y10T 408/50* (2015.01); *Y10T 409/30392* (2015.01); *Y10T 409/30728* (2015.01); *Y10T 409/303752* (2015.01); *Y10T 409/304088* (2015.01); *Y10T 409/306888* (2015.01)

(58) Field of Classification Search
CPC . Y10T 408/16; Y10T 408/172; Y10T 408/50; Y10T 409/303752; Y10T 409/304088; Y10T 409/30728; Y10T 409/307336; Y10T 409/306832; Y10T 409/306888; Y10T 409/306944
USPC ........ 408/1 R, 8, 11, 67; 409/131, 137, 186, 409/187, 188, 194, 195
See application file for complete search history.

(56) References Cited

U.S. PATENT DOCUMENTS

| | | | | |
|---|---|---|---|---|
| 4,471,444 | A * | 9/1984 | Yee ................... | B23Q 17/0947 700/175 |
| 4,667,113 | A * | 5/1987 | Nakajima ............ | B23B 49/001 250/559.08 |
| 5,988,954 | A * | 11/1999 | Gaskin ............... | B23Q 11/0046 408/67 |
| 6,206,621 | B1 * | 3/2001 | Sebring ................ | B23F 17/003 408/67 |
| 6,394,940 | B1 * | 5/2002 | Sugata ............... | B23Q 11/0046 408/61 |
| 6,854,937 | B1 * | 2/2005 | Weiss ................. | B23Q 11/0046 144/136.95 |
| 7,956,895 | B2 * | 6/2011 | Kojima .............. | H04N 1/00278 348/207.2 |
| 2003/0066179 | A1 * | 4/2003 | Shiba ................. | B23Q 11/0042 29/426.3 |
| 2006/0251484 | A1 * | 11/2006 | Yoshida ................ | B23Q 15/16 409/131 |
| 2010/0067998 | A1 * | 3/2010 | Miyamoto ......... | B23Q 11/0046 409/190 |
| 2013/0253670 | A1 * | 9/2013 | Chung ............... | G05B 19/4065 700/79 |

* cited by examiner

SYSTEMS AND METHODS FOR REAL-TIME MONITORING OF MICROMILLING TOOL WEAR

CROSS-REFERENCE TO RELATED APPLICATIONS

This application is a divisional of U.S. Ser. No. 15/227,229 filed on Aug. 3, 2016, now U.S. Patent Application Publication No. 2016-0339556 entitled "SYSTEMS AND METHODS FOR REAL-TIME MONITORING OF MICROMILLING TOOL WEAR". U.S. Ser. No. 15/227,229 is a continuation of PCT Application No. PCT/US2015/014848 filed on Feb. 6, 2015 and entitled "SYSTEMS AND METHODS FOR REAL-TIME MONITORING OF MICROMILLING TOOL WEAR". PCT Application No. PCT/US2015/014848 claims priority to, and the benefit of, U.S. Provisional Application Ser. No. 61/936,607 filed on Feb. 6, 2014 and entitled "SYSTEMS AND METHODS FOR REAL-TIME MONITORING OF MICROMILLING TOOL WEAR." All of the above applications are hereby incorporated by reference in their entirety.

TECHNICAL FIELD

The present disclosure relates to micromilling, and in particular to monitoring of tool wear in connection with the same.

BACKGROUND

Micromilling is a material-removal manufacturing process for producing parts that typically are less than 1 mm in size, with features measured in microns, and sub-micron manufacturing tolerances. A micromilling machine typically consists of a tool known as a micro-endmill placed in a spindle. The micro-endmill contains one or more teeth. The spindle typically rotates the micro-endmill at speeds exceeding 50,000 RPM while advancing the tool through the material. Each time a tooth of the micro-endmill passes through the material, a chip is produced and removed from the material. As the micro-endmill removes chips, the teeth become dull. Dull micro-endmill teeth cause a manufacturing defect known as "burring" and eventually cause the micro-endmill to break.

Measuring the state of wear of a micro-endmill is typically done by halting the cutting process, removing the micro-endmill from the machine, and examining it under a microscope. The radius of the cutting edge of the teeth is measured visually, and is used as a quantification of tool wear. This process is cumbersome and time-consuming; accordingly, improved systems and methods for assessing tool wear are desirable.

SUMMARY

In an exemplary embodiment, a tool wear monitoring system comprises a skirt couplable to a micro-endmill to contain chips produced during operation of the micro-endmill. The system further comprises a tube coupled to the skirt, the tube configured to extract air from the skirt and carry the chips to a nozzle. The system further comprises an adhesive tape disposed at an outlet of the nozzle to catch chips exiting the nozzle, a conveyor belt to move the adhesive tape into the field of view of a camera, the camera operative to obtain images of the chips on the adhesive tape, and a software program operative on a computing device to count the chips from the images.

In another exemplary embodiment, a method for monitoring wear of a micromilling tool comprises determining an initial chip production rate; extracting, via a skirt, tube, and pump, chips produced during operation of the micromilling tool; depositing, from a nozzle coupled to the tube, the chips on adhesive tape; moving, via a conveyor belt, the adhesive tape to bring the chips into the field of view of a camera; acquiring, via the camera, an image of the chips; counting, by an image processing system, the chips in the image to determine a current chip production rate; and calculating, using the initial chip production rate and the current chip production rate, the wear status of the micromilling tool.

In another exemplary embodiment, a method of counting chips produced by a micro-endmill comprises obtaining, by a system for monitoring tool wear, an image of chips captured by adhesive tape; converting the image to grayscale; thresholding the image to remove excessive lustre; equalizing a histogram of the image to improve contrast; thresholding the image to identify a background grayscale level; converting the image to black and white; eroding the image to reduce pixelated errors; performing edge detection on the image to form edges therein; performing dilation on the image to connect at least a portion of the edges; filling the image components arising from the edge detection; and counting the chips appearing in the image.

BRIEF DESCRIPTION OF THE DRAWINGS

With reference to the following description and accompanying drawings.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the present disclosure.

For the sake of brevity, conventional techniques for machining, micromilling, microscopy, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical tool wear monitoring system.

In accordance with principles of the present disclosure, tool wear may be monitored during the cutting process via measuring the rate of chip production. The "minimum chip thickness" principle indicates that a tooth cannot produce a chip that is thinner than ⅓ of the cutting edge radius of that tooth. Accordingly, principles of the present disclosure contemplate real-time monitoring of the state of wear of a micro-endmill; this may be accomplished by recognizing the existence of a relationship between the state of tool wear and a discrepancy between the number of chips that should be produced (based, for example, on machining parameters) and the number of chips that are actually produced. An exemplary tool wear monitoring system may be configured to measure this discrepancy and thus infer the state of tool wear.

As opposed to prior approaches, principles of the present disclosure enable monitoring of micro-scale tool wear without halting the cutting process, and thus enable measurement of micro-scale tool wear rates. Machining parameters may be adjusted according to the amount of tool wear. Additionally, principles of the present disclosure enable prevention of micro-scale tool wear-related defects such as burring and tool breakage.

Figure 1:
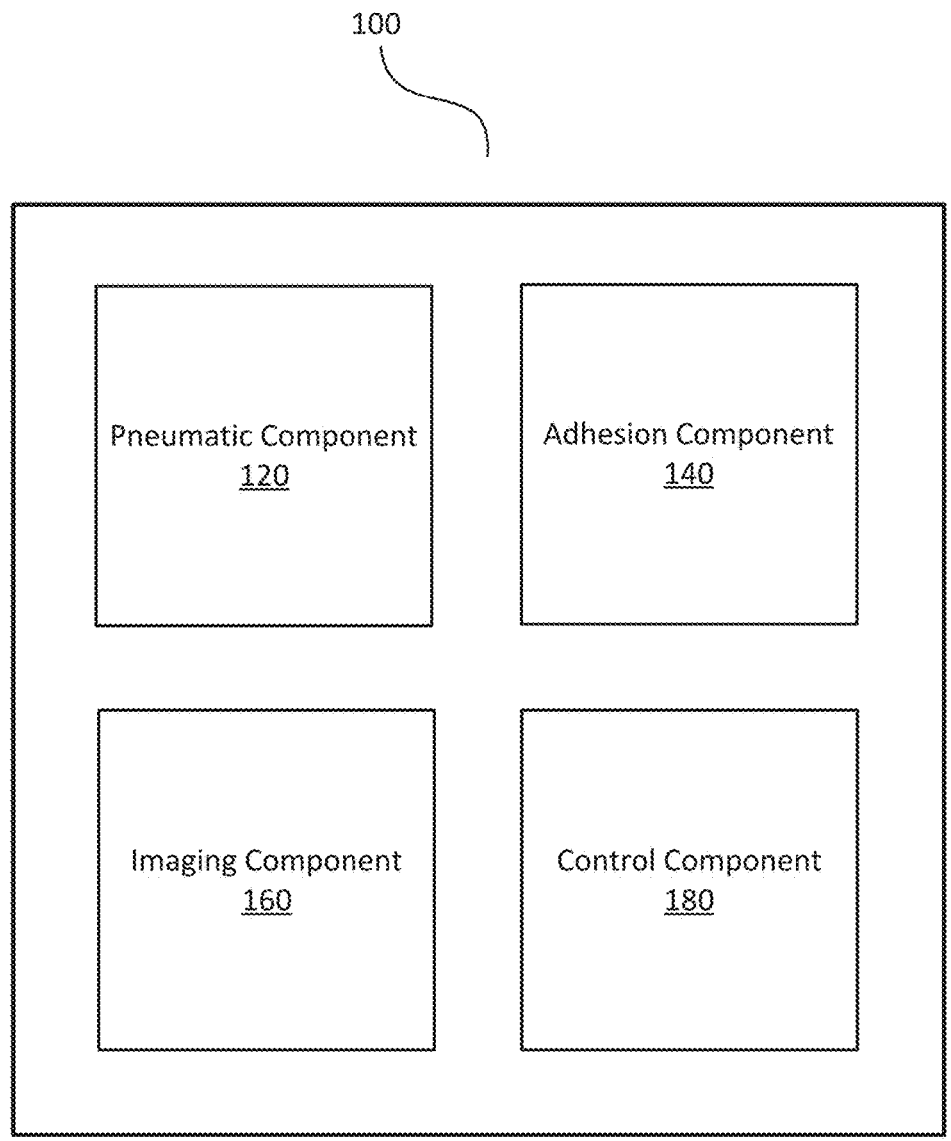
FIG. 1 illustrates a block diagram of an exemplary micromilling tool wear monitoring system in accordance with an exemplary embodiment.

A tool wear monitoring system may be any system configured to facilitate detection or inference regarding the wear state of a milling tool. In an exemplary embodiment, with reference to FIGS. 1, 2, and 3, a tool wear monitoring system 100 comprises a pneumatic component 120, an adhesion component 140, an imaging component 160, and a control component 180. Pneumatic component 120 is configured to extract chips created during a milling process from the work area, and deliver the chips elsewhere for evaluation. Adhesion component 140 is configured to secure and/or deliver the chips for evaluation. Imaging component 160 is configured to assess and evaluate the chips, and consequently determine and/or infer the wear state of a tool. Control component 180 is configured to provide feedback and/or control to a system or portions thereof, for example a micromilling machine, responsive to the determination of the wear state of a tool. Components of tool wear monitoring system 100 may be physically, electrically and/or communicatively coupled to one another, for example at least partially via wired or wireless communication links 190.

In various exemplary embodiments, tool wear monitoring system 100 is configured to allow for real-time assessment of the rate of chip production in a micromilling machine 101 as operative on a workpiece 105. Using information from the minimum chip thickness effect, tool wear can be inferred.

Figure 2:
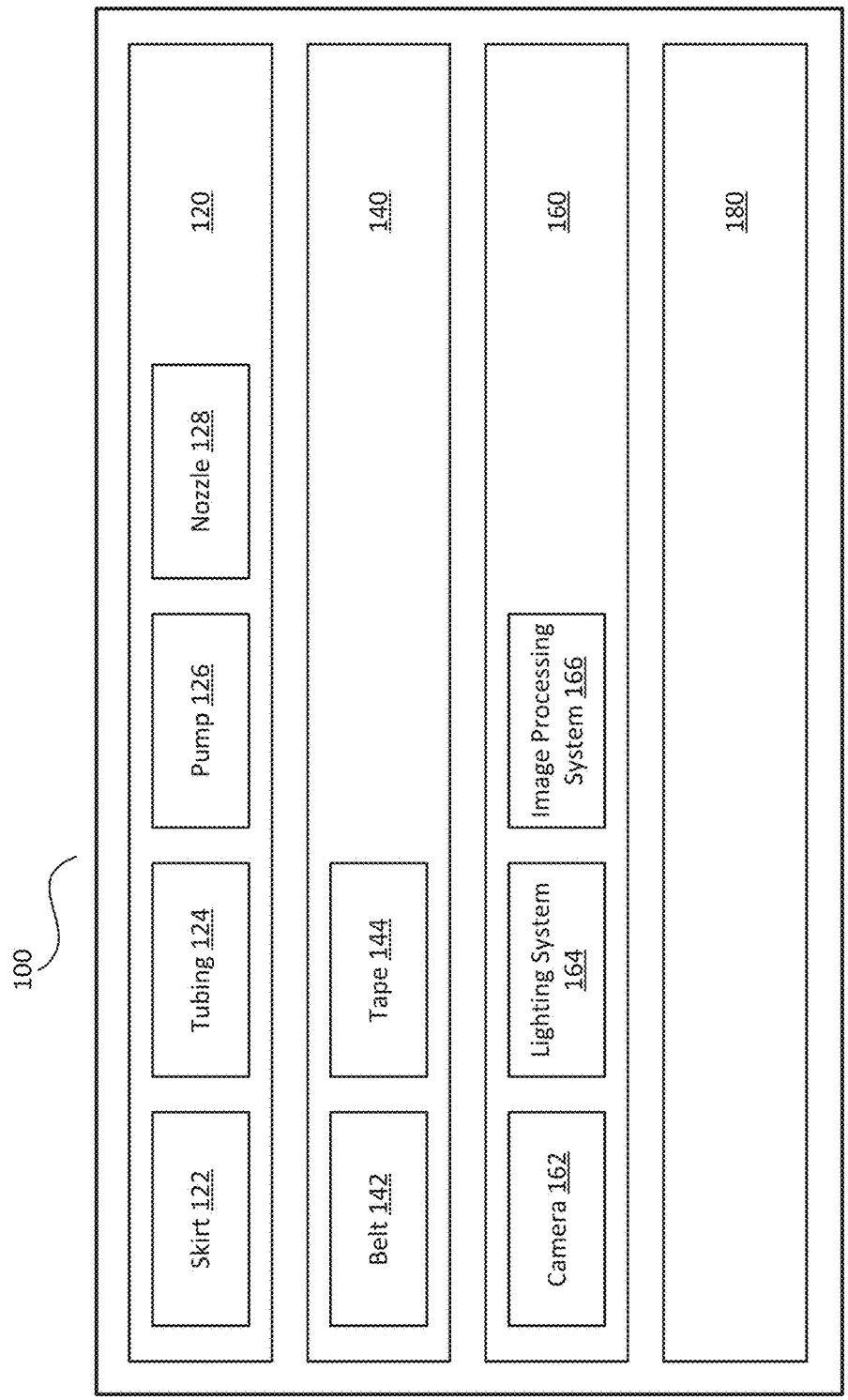
FIG. 2 illustrates a block diagram of exemplary components of a micromilling tool wear monitoring system in accordance with an exemplary embodiment.
Figure 3:
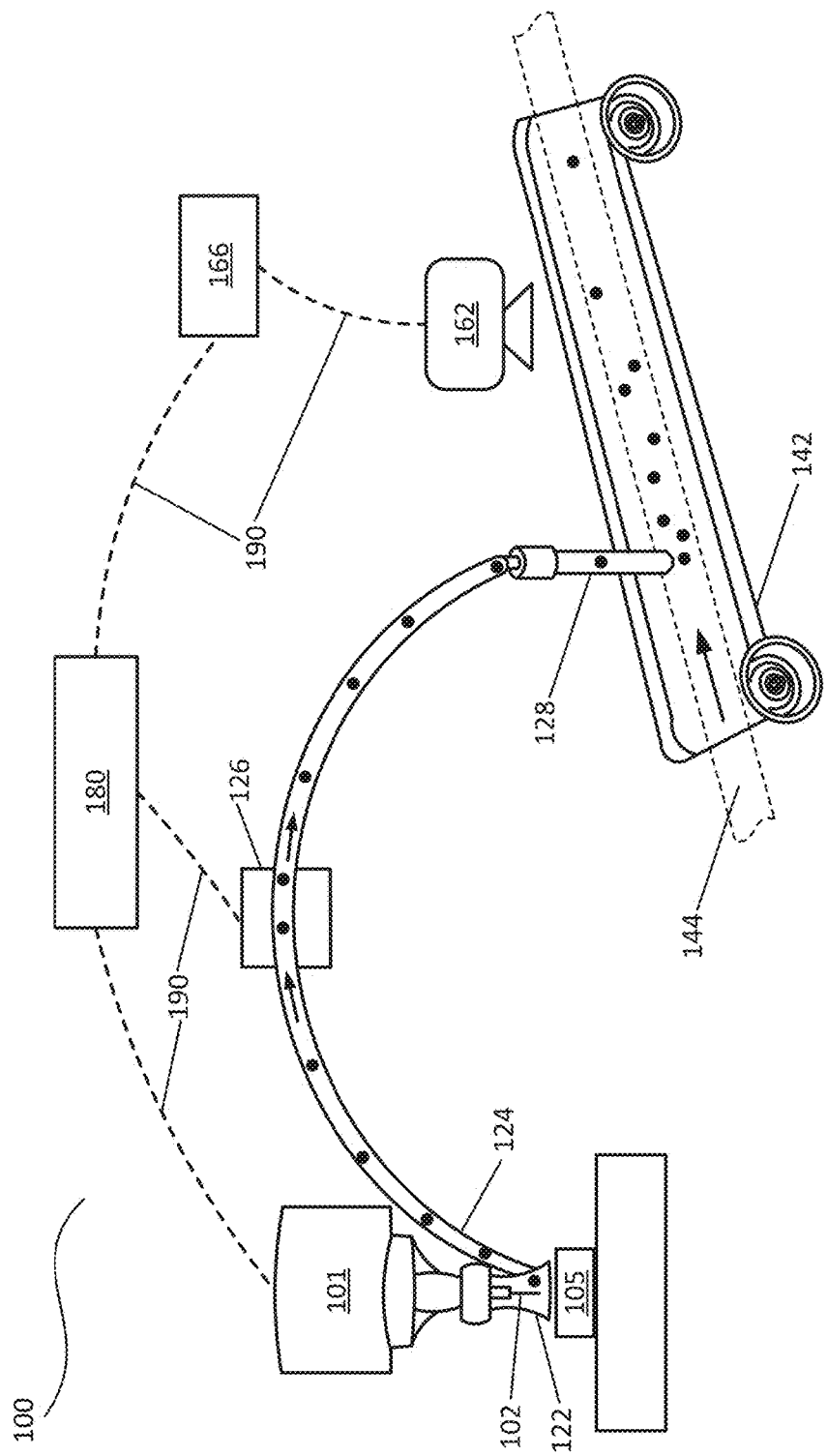
FIG. 3 illustrates an exemplary micromilling tool wear monitoring system in accordance with an exemplary embodiment.

In an exemplary embodiment, with reference to FIGS. 2 and 3, pneumatic component 120 comprises skirt 122, tubing 124, pump 126, and nozzle 128. In various exemplary embodiments, skirt 122 is configured to be fitted around and/or coupled to micro-endmill 102, for example as illustrated in FIG. 3. Skirt 122 functions as a physical containment or funneling element to contain chips as they are produced and cause the chips to be caught in an airflow stream through tubing 124. In an exemplary embodiment, skirt 122 comprises a 0.75 inch diameter transparent plastic suction cup having a height of about 0.5 inch. However, skirt 122 may comprise any suitable material and dimensions configured to contain chips produced by micro-endmill 102. A hole of suitable diameter, for example between about 0.05 inches and about 0.15 inches, and preferably about 0.08 inches, is punched through the side of skirt 122 to facilitate coupling with tubing 124. Skirt 122 is coupled to micro-endmill 102 such that the bottom of the skirt is positioned from about 0.5 mm to about 1 mm above the tip of the endmill; in other words, when micro-endmill 102 is operative, a gap of between about 0.5 mm and about 1 mm exists between the bottom of skirt 122 and the surface of workpiece 105. This provides sufficient clearance for air to be pulled into the interior of skirt 122, but maintains a sufficient pressure differential between the exterior and the interior of skirt 122 so that chips are not allowed to leave the interior of skirt 122.

Tubing 124 is coupled to skirt 122. Tubing 124 is configured to provide vacuum extraction of the air and chips contained by skirt 122. Tubing 124 may comprise polyethylene or other suitable strong and/or flexible material. Additionally, polyethylene provides resistance to static electricity and thus reduces the likelihood of chips becoming stuck in tubing 124; moreover, polyethelyne is sufficiently hard enough to prevent chips from becoming embedded in the interior wall of the tube and is also resistant to kinking.

In various exemplary embodiments, tubing 124 is configured with an inner diameter of between about 0.1 inches and about 0.25 inches, and preferably about 0.125 inches, in order to provide a suitable airflow velocity and room for movement of chips therethrough.

Tubing 124 is coupled to pump 126. Pump 126 supplies vacuum pressure to extract chips from the interior of skirt 122 by way of tubing 124. In order to ensure accurate chip rate production calculations, pump 126 is desirably selected such that no chips can be lodged in the interior during operation and dislodged at a later time during operation. Thus, in various exemplary embodiments, pump 126 comprises a vacuum pump operative on the venturi principle and having no moving parts in the interior of the pump. Rather, the vacuum force is created by a pressurized air input. In one exemplary embodiment, pump 126 comprises a Vaccon DF 1-3 venturi suction pump. In this exemplary embodiment, pump 126 provides a static vacuum of approximately 12" Hg (400 mbar) at 100 psi (7 bar) supply pressure; corresponding air consumption is approximately 100 lpm (liters per minute). However, any suitable pump 126 may be utilized, as desired.

Tubing 124 is coupled to nozzle 128. Tubing 124 and nozzle 128 may be separate components; alternatively, tubing 124 and nozzle 128 may be monolithic; i.e., tubing 124 may widen at one end into a section considered to be nozzle 128. In various exemplary embodiments, nozzle 128 has an inner diameter twice that of tubing 124. In other exemplary embodiments, nozzle 128 has an inner diameter four times that of tubing 124. Moreover, nozzle 128 may be configured with any suitable inner diameter configured to provide sufficient airflow slowing as compared to the flow speed in tubing 124, in order to ensure adhesion of chips in connection with adhesion component 140. This relationship in tubing diameters is important in order to increase the air velocity where the chips are being pulled into the air stream at skirt 122, and to decrease the air velocity where the chips are being pushed out of the air stream via nozzle 128 onto tape 144. Increasing the air speed at tubing 124 inlet helps to prevent chip loss at the inlet due to chip scatter from the spindle, while decreasing air speed at nozzle 128 outlet helps prevent chip loss due to air dispersion. A four-fold increase in the inner diameter between tubing 124 and nozzle 128 results in an approximately sixteen-fold decrease in airflow velocity at the outlet of nozzle 128.

Nozzle 128 disperses chips from tubing 124 onto tape 144. Nozzle 128 functions to prevent chips from being lost (that is, blown into the environment rather than adhered to tape 144) and to roughly equally disperse chips across the width of tape 144 within the field-of-view of camera 162. In order to minimize chip dispersion, the end of nozzle 128 may desirably be placed between about 0.1 inches and about 0.25 inches, and preferably about 0.125 inches, above the surface of tape 144.

Pneumatic component 120 may be powered as suitable, for example by a single pressured airline that provides pressure for pump 126 and for the cooling system of the spindle of micromilling machine 101. During operation of pneumatic component 120, airstream velocity at the inlet of tubing 124 is desirably between about 150 meters per second (m/s) and about 250 m/s, and preferably about 210 m/s, when tubing 124 is configured with an inner diameter of 0.125 inches. Additionally, airstream velocity at the outlet of nozzle 128 is desirably below 20 m/s when nozzle 128 is configured with an inner diameter of about 0.5 inches. In this manner, chips are effectively collected from within skirt 122 and delivered and adhered to tape 144.

In various exemplary embodiments, adhesion component 140 comprises belt 142 and tape 144. Belt 142, for example a conveyor belt, operates as a base to move a strip of tape 144 material past nozzle 128 and thereafter past camera 162. Tape 144 operates to collect and secure chips exiting nozzle 128.

Belt 142 may comprise any suitable conveyor belt or similar device. In various exemplary embodiments, belt 142 may be configured with a suitable and/or adjustable belt speed, for example a speed range of between about 0.5 meters per minute (m/m) to about 20 m/m. Additionally, belt 142 may be configured with a suitable belt color to reduce image glare and provide contrast for chips (for example, for dark chips, a matte white belt color is desirable, while for lighter colored chips such as aluminum, a matte black belt color may be desirable). Belt 142 may be configured with a multicolor or striped belt in order to allow tape 144 to be moved back and forth thereon to a suitable background color for the currently produced chips, as desired.

Tape 144 may comprise any suitable tape configured to be deliverable via belt 142 and capable of retaining chips. In various exemplary embodiments, tape 144 has a weak adhesive on one side and a strong adhesive on the other side. The roll of tape 144 is positioned so that the weak adhesive makes contact with belt 142 and the strong adhesive faces towards nozzle 128. As belt 142 moves, the friction force of the weak adhesive against belt 142 pulls tape 144 off of the tape sourcing roll onto belt 142. Tape 144 may be configured with any suitable dimensions, however, in various exemplary embodiments, tape 144 is configured with a width approximately twice that of the inner diameter of nozzle 128 so that chips may be fully captured on tape 144. Tape 144 may be selected to be generally transparent, translucent, and/or opaque, as desired, depending on the color of belt 142 and in order to provide suitable imaging contrast with chips.

Once chips are secured on tape 144, the chips are advanced via belt 142 to camera 162. Camera 162 may comprise any suitable image capture device. In one exemplary embodiment, camera 162 comprises a Dino-Lite brand digital universal serial bus (USB) microscope. Camera 162 may be mounted on an adjustable mounting bracket to allow for greater functionality of the camera as well as initial focusing. Camera 162 may be configured with a field of view at least as wide as the width of tape 144 in order to obtain suitable images for evaluation (i.e., in order to ensure that chips captured on tape 144 do not fall outside the field of view). Camera 162 takes images of tape 144 and chips captured thereon, for example at regular intervals or on demand. When camera 162 is acquiring an image, belt 142 is desirably paused, for example via a signal from image processing system 166, in order to minimize motion blurring. Belt 142 thereafter returns to motion.

Lighting system 164 provides illumination to chips captured on tape 144 as they pass through the field of view of camera 162. Lighting system 164 may comprise any suitable component or component for providing bright diffuse lighting as is known in the art.

Image processing system 166 receives images from camera 162 and processes them to identify and count individual chips. Image processing system 166 may comprise any suitable hardware and/or software components. In one exemplary embodiment, image processing system 166 comprises a laptop personal computer having technical computing software such as Matlab operative thereon. Additionally, it will be understood that in certain exemplary embodiments, image processing system 166 and tool control component 180 may all be operative on and/or comprise hardware and/or software components of a single system, for example a laptop personal computer, desktop computer, tablet, smartphone, and/or the like.

In various exemplary embodiments, control component 180 is configured to control one or more of micromilling machine 101, pump 126, belt 142, camera 162, and/or image processing system 166. For example, responsive to image processing system 166 determining that the rate of chip production has fallen below a threshold, control component 180 may send a signal to micromilling machine 101 to increase the feed rate. Moreover, control component 180 may control the interval of image acquisition by camera 162, the speed and/or starting/stopping of belt 142, and any other suitable aspects of tool wear monitoring system 100.

Figure 4A:
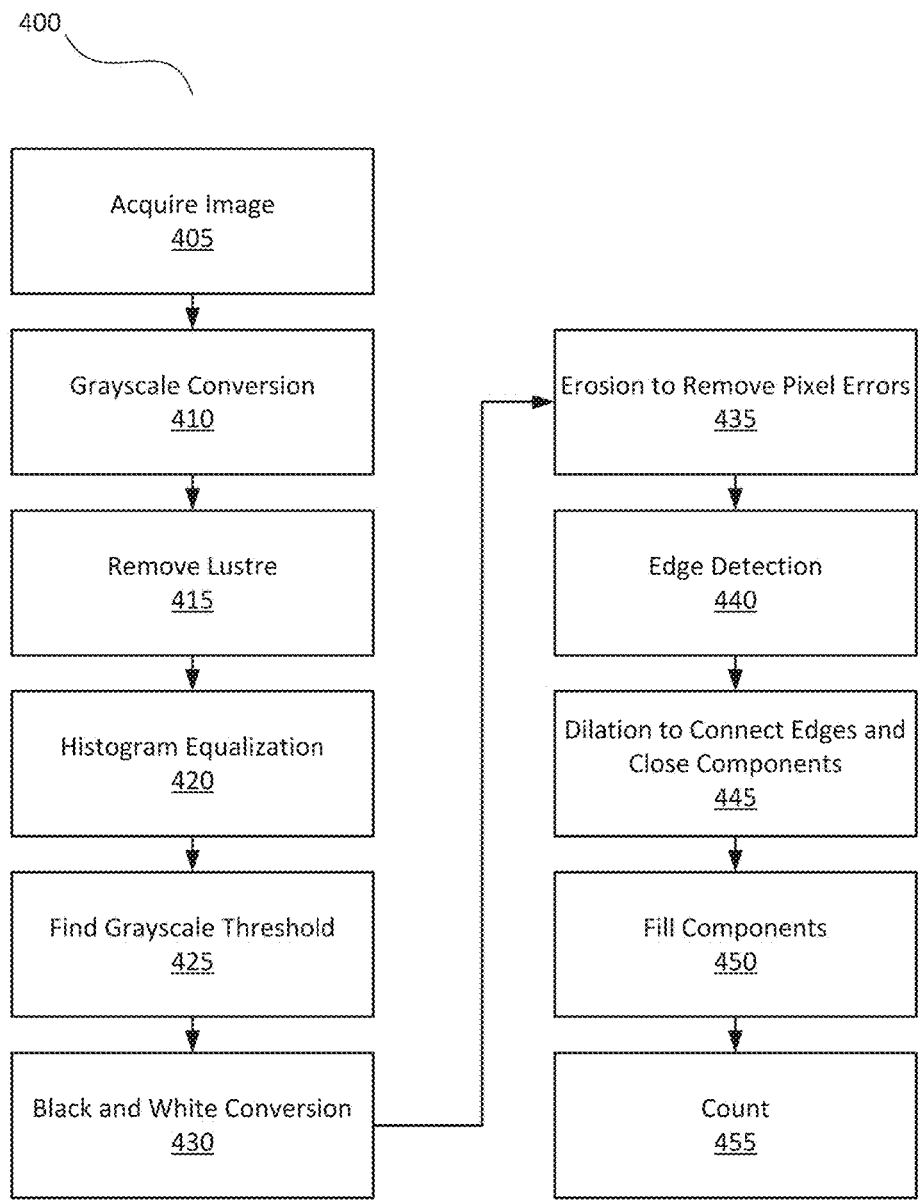
FIG. 4A illustrates an exemplary method for processing images in connection with use of a micromilling tool wear monitoring system in accordance with an exemplary embodiment.
Figure 4B:
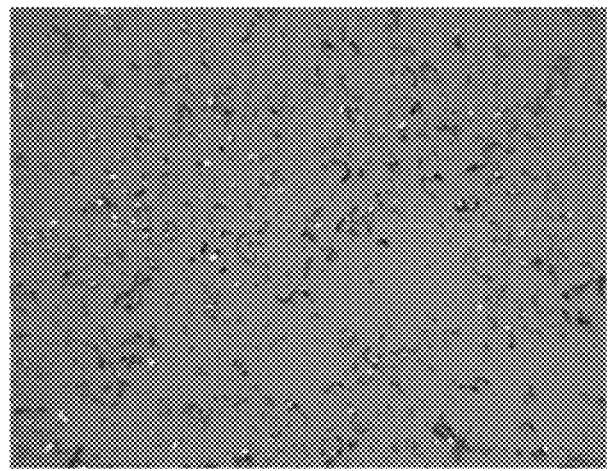
FIGS. 4B through 4J illustrate image processing steps in an exemplary method for processing images in connection with use of a micromilling tool wear monitoring system in accordance with an exemplary embodiment.
Figure 4C:
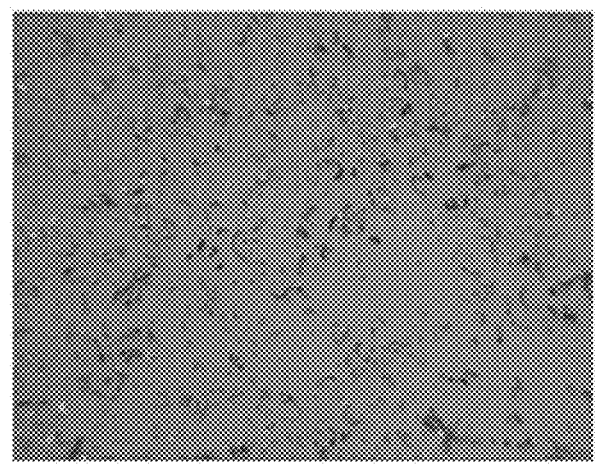
Figure 4D:
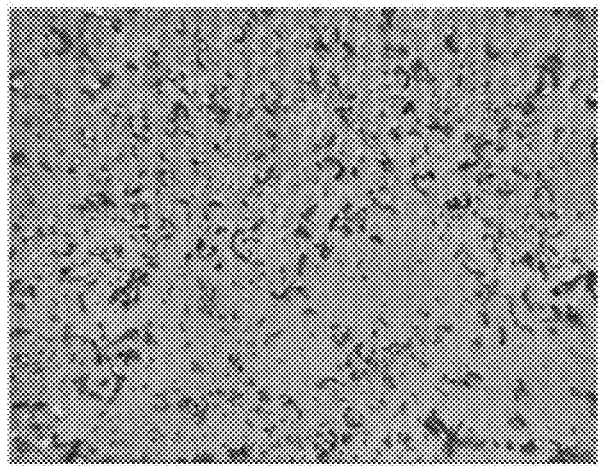
Figure 4E:
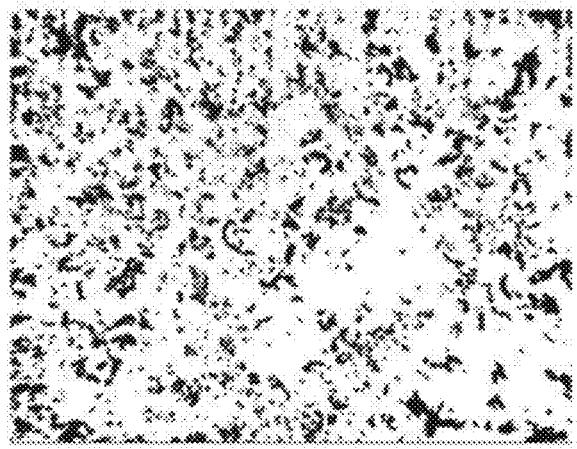
Figure 4F:
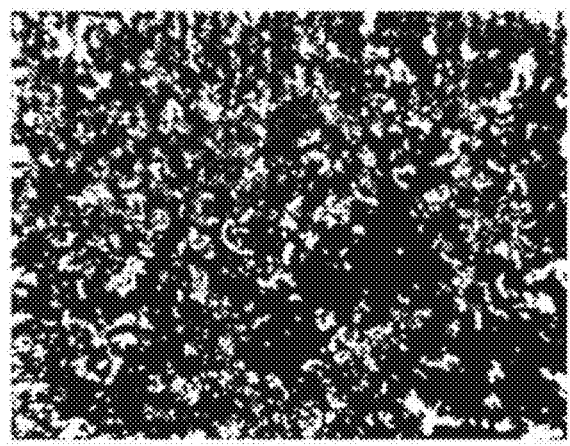
Figure 4G:
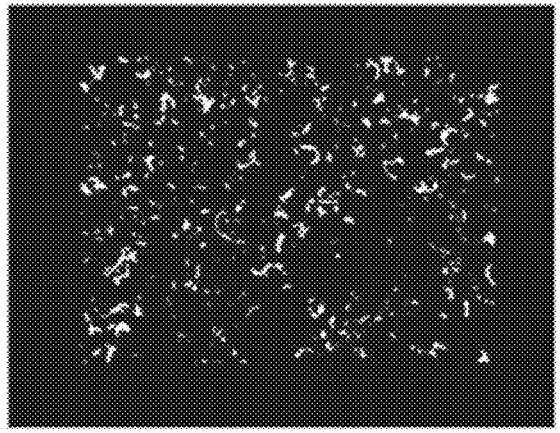
Figure 4H:
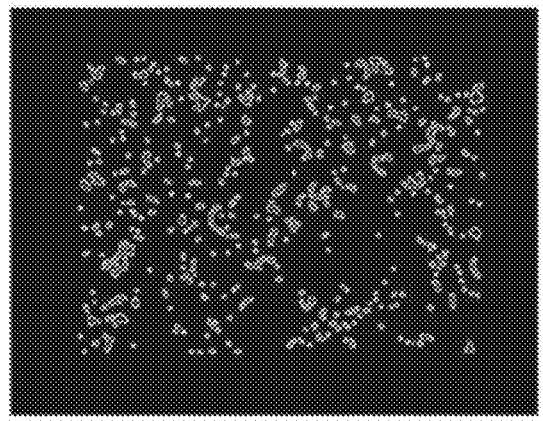
Figure 4I:
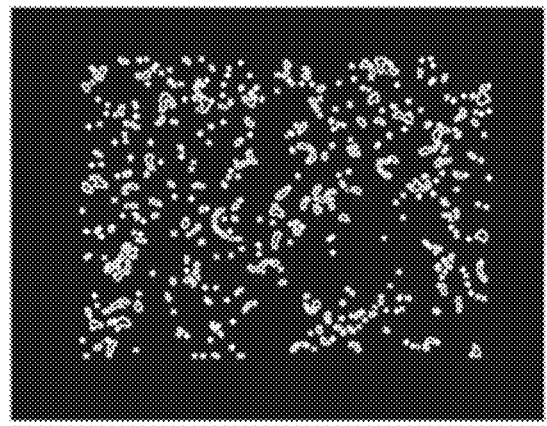
Figure 4J:
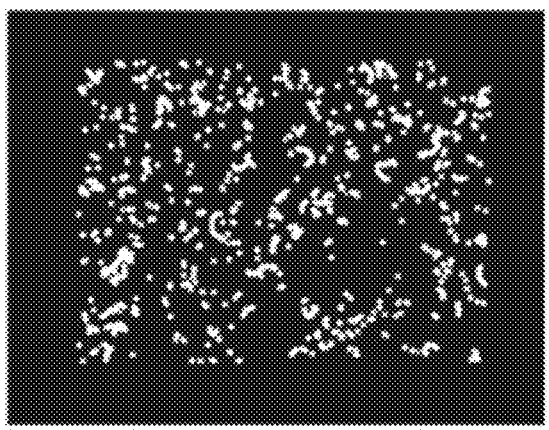

With reference now to FIGS. 4A-4J, in various exemplary embodiments a method 400 for counting chips comprises acquiring a digital image from camera 162 (step 405, illustrated in FIG. 4B). The image is converted to grayscale (step 410). Thresholding is performed to remove excessive lustre (step 415, illustrated in FIG. 4C). Histogram equalization is performed to improve contrast (step 420, illustrated in FIG. 4D). Thresholding is performed to find the grayscale background level (step 425, illustrated in FIG. 4E) and the image is converted to black and white (step 430, illustrated in FIG. 4F). Erosion is performed to reduce pixelated errors (step 435, illustrated in FIG. 4G). Edge detection is performed (step 440, illustrated in FIG. 4H), and dilation is performed to connect edges and close components (step 445, illustrated in FIG. 4I). Components are filled (step 450, illustrated in FIG. 4J) and then counted (step 455).

Figure 5A:
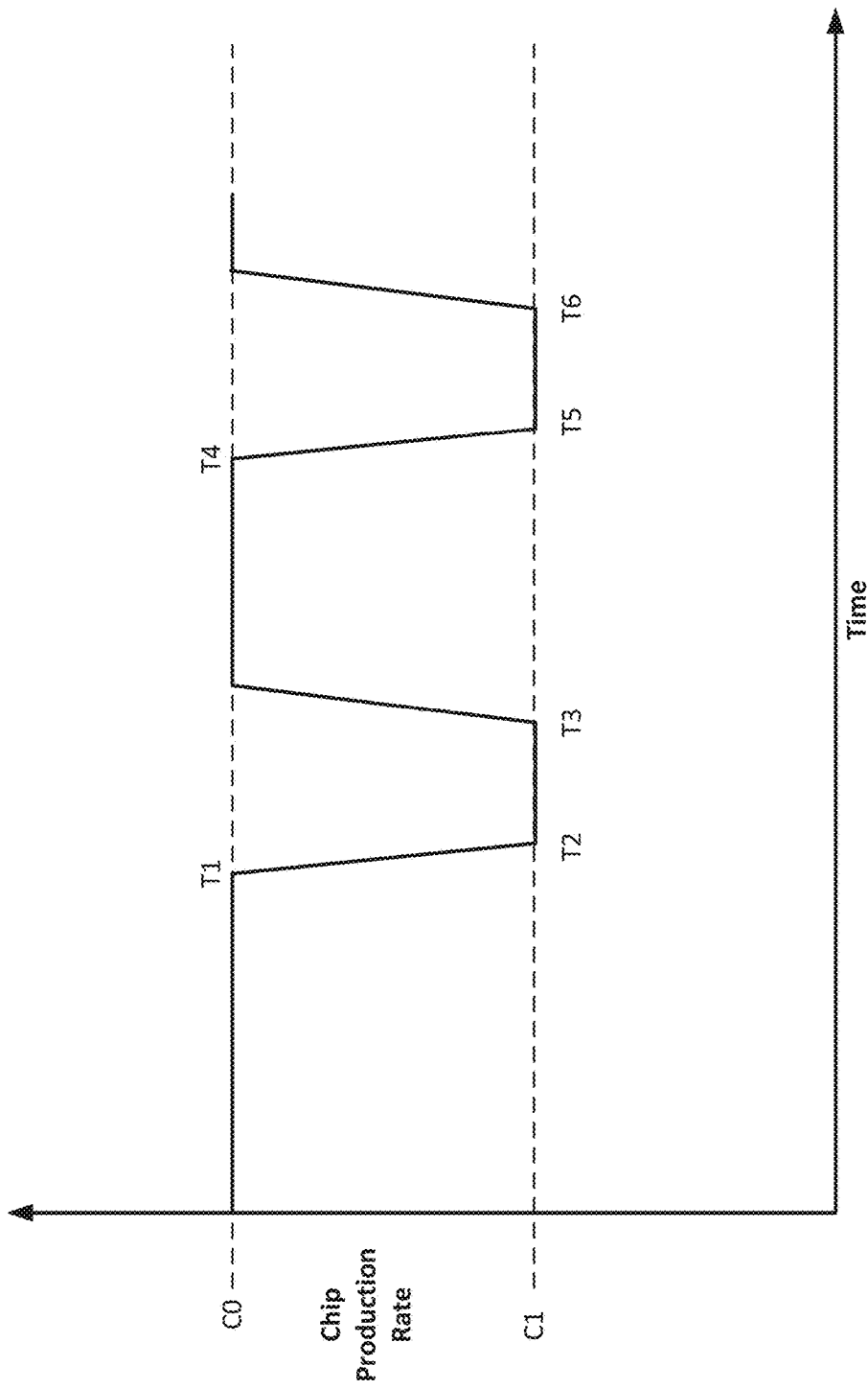
FIG. 5A illustrates chip production over time in accordance with an exemplary embodiment.
Figure 5B:
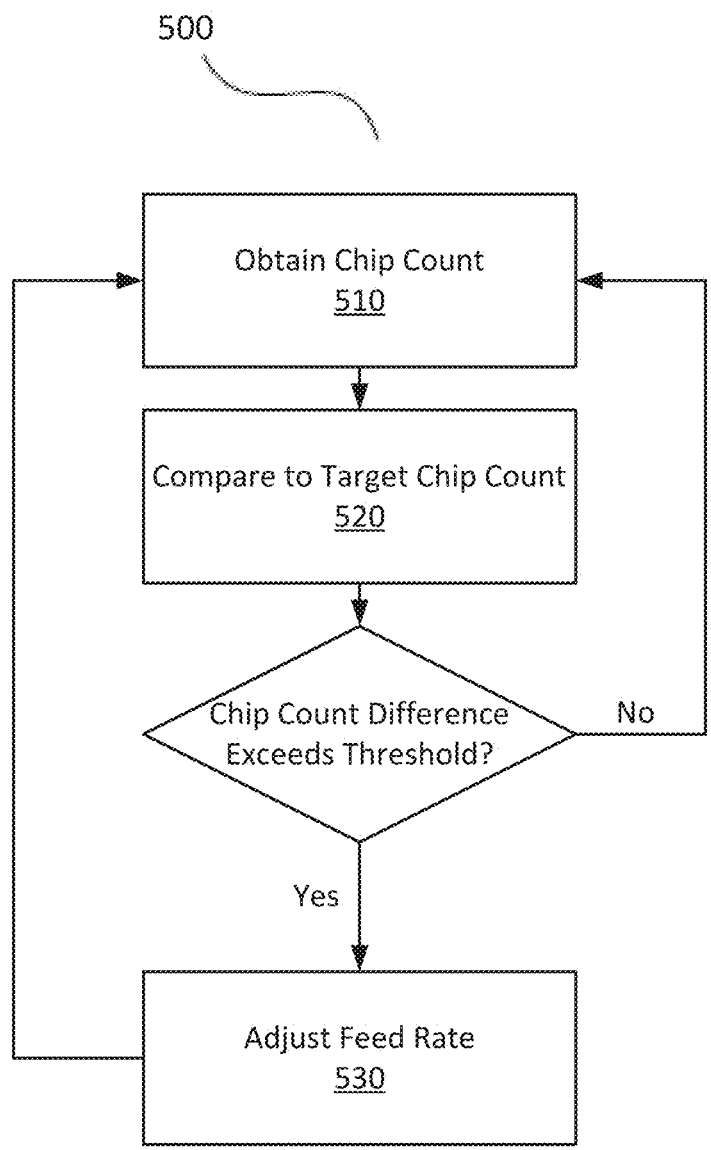
FIG. 5B illustrates a method for monitoring micromilling tool wear in accordance with an exemplary embodiment.

Turning now to FIG. 5B, in an exemplary embodiment a method 500 for monitoring micromilling tool wear comprises obtaining a chip count resulting from operation of a micro-endmill (step 510). The chip count is compared to a target chip count (step 520), for example a target chip count equal to a chip count that would be expected if the micro-endmill were operating at the expected tooth-passing rate. If the difference between the chip count and the target chip count exceeds a threshold, the feed rate may be adjusted (step 530), for example increased, in order to increase the chip production rate. The process is repeated, as desired, in order to regularly monitor the chip count and/or adjust the feed rate. In one exemplary embodiment, the threshold for the difference between the target chip count and the chip count is a decrease of between about 40% and about 60%. Moreover, a suitable threshold may be selected based on the understanding that chip production typically goes from a level X to about a level X/2 as the tool wears, representing slippage of approximately every other tooth in the micro-endmill tool.

The foregoing exemplary embodiments have presented airflow-driven extraction of chips. It will be appreciated that principles of the present disclosure are also applicable to fluid-driven extraction of chips, for example via cutting fluid. In these exemplary embodiments, cutting fluid may be directed over and/or around workpiece 105 and then extracted together with the resulting chips, the cutting fluid and chip mixture may be thereafter passed through a generally planar plastic enclosure to permit photographing/counting of the chips therein.

In tool wear monitoring system 100, the rate at which chips pass by camera 162 may be compared to the expected tooth-passing rate of micro-endmill 102. If the chip production rate is equal to the tooth-passing rate, then the tool cutting-edge radius is less than that calculated by the minimum chip thickness equation. Similarly, if the chip production rate drops below the tooth-passing rate, then the tool cutting-edge radius is known to be equal to that calculated by the minimum chip thickness equation.

In an exemplary embodiment, the feed rate and spindle speed of micromilling machine 101 are initially set so that the chip production rate is equal to the tooth passing rate. The chip production rate is then observed until the chip production rate drops below the tooth passing rate. FIG. 5A shows an example plot of chip production rate with time as will be observed in this process. Times and chip production rate values are labeled, and will be referred to in the following equations.

At the beginning of the tool-wear measuring operation (prior to time T1), the feed rate f0 is set according to Eq. (1), where re0 is the initial cutting-edge radius of the cutting tool, before cutting begins, n is the number of teeth on the cutter, N is the spindle speed, and δ is a small value, perhaps 1% of the value calculated if is zero.

$$f0 = 0.3 * re0 * n * N + \delta \quad \text{(Equation 1)}$$

The initial chip production rate C0 will be equal to the tooth passing rate, as shown in Eq. (2).

$$C0 = n * N \quad \text{(Equation 2)}$$

The chip production rate is measured by tool wear monitoring system 100. At some future time T2, the chip production rate is observed to decrease. At that time, the amount of tool wear re1 at the previous time T1 can be calculated according to Eq. (3).

$$re1 = f0/(0.3 * n * N) \quad \text{(Equation 3)}$$

At time T3, the feed rate is increased to the value f1, calculated as in Eq. (4).

$$f1 = 0.3 * re1 * n * N + 6 \quad \text{(Equation 4)}$$

When the feed rate is increased to value f1, the chip production rate will rise back to C0 and become constant. The tool's continued wear will cause the chip production rate to drop again, detected at time T5. At that time, the amount of tool wear re2 at time T4 can be calculated according to Eq. (5).

$$re2 = f1/(0.3 * n * N) \quad \text{(Equation 5)}$$

At time T6, the feed rate is increased to the value f2, calculated as in Eq. (6).

$$f2 = 0.3 * re2 * n * N + 6 \quad \text{(Equation 6)}$$

Generalizing, at each future time $T_{i+1}$ that the chip production rate is observed to drop below the value C0, the amount of tool wear rei at the previous time $T_i$ is calculated according to Eq. (7), and the feed rate is increased to the value fi as in Eq. (8).

$$rei = fi - 1/(0.3 * n * N) \quad \text{(Equation 7)}$$

$$fi = 0.3 * rei * n * N + S \quad \text{(Equation 8)}$$

This process may be continued until the tool breaks and/or is otherwise replaced. The tool wear rate is given by the values of rei at the times $T_i$ as i varies from 0 until the tool breaks. In various exemplary embodiments, C1 is approximately half the value of C0, representing slippage of approximately every other tooth in micro-endmill 102.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" or "at least one of A, B, and D" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for monitoring wear of a micromilling tool, the method comprising:
   determining an initial chip production rate;
   extracting, via a skirt, a tube coupled to the skirt, and a pump coupled to the tube, chips produced during operation of the micromilling tool;
   depositing, from a nozzle coupled to the tube, the chips on adhesive tape;
   moving, via a conveyor belt, the adhesive tape to bring the chips into the field of view of a camera;
   acquiring, via the camera, an image of the chips on the adhesive tape;
   counting, by an image processing system, the chips in the image to determine a current chip production rate; and
   calculating, using the initial chip production rate and the current chip production rate, the wear status of the micromilling tool.

2. The method of claim 1, further comprising adjusting, responsive to the calculating the wear status, a feed rate associated with the micromilling tool.

3. The method of claim 2, wherein, as the chip count decreases, the feed rate of the micro-endmill is increased.

4. The method of claim 1, wherein the counting, by the image processing system, the chips in the image comprises:
   converting the image of the chips to grayscale;
   thresholding the image of the chips to remove excessive lustre;
   equalizing a histogram of the image of the chips to improve contrast;
   thresholding the image of the chips to identify a background grayscale level;
   converting the image of the chips to black and white;
   eroding the image of the chips to reduce pixelated errors;
   performing edge detection on the image of the chips to form edges therein;
   performing dilation on the image of the chips to connect at least a portion of the edges;
   filling a component in the image of the chips arising from the edge detection; and
   counting the chips appearing in the image of the chips.

5. The method of claim 1, further comprising pausing operation of the conveyor belt during the time the camera acquires the image of the chips.

6. The method of claim 1, wherein an outlet of the nozzle has an inner diameter at least four times larger than the inner diameter of the tube at the location the tube is coupled to the skirt.

7. The method of claim 1, wherein a bottom of the skirt is disposed within 1 mm of a workpiece in order to provide airflow into the interior of the skirt while still containing chips produced within the skirt.

8. The method of claim 1, wherein the airspeed in the tube at the location where the tube couples to the skirt exceeds 200 meters per second.

9. The method of claim 1, wherein the airspeed at an exit of the nozzle is less than 15 meters per second.

10. The method of claim 1, wherein the width of the adhesive tape is at least twice the inner diameter of the nozzle.

11. The method of claim 1, wherein the outlet of the nozzle is disposed between about 0.1 inches and about 0.25 inches above the surface of the adhesive tape.

12. The method of claim 1, further comprising increasing the feed rate of the micro-endmill when the current chip production rate falls below 60% of the initial chip production rate.

13. The method of claim 1, wherein the pump is a vacuum pump.

14. The method of claim 13, wherein the vacuum pump supplies a static vacuum of 400 mbar at 7 bar supply pressure.

15. The method of claim 1, wherein the moving the chips via the conveyor belt is performed at a speed of between 0.5 meters per minute and 20 meters per minute.

16. The method of claim 1, wherein:
   the adhesive tape has a first adhesive disposed on a first side of the adhesive tape;
   the adhesive tape has a second adhesive disposed on a second side of the adhesive tape;
   the first adhesive is stronger than the second adhesive; and
   the chips are deposited on the first side of the adhesive tape.

* * * * *